US012617343B2

(12) United States Patent
Longest et al.

(10) Patent No.: US 12,617,343 B2
(45) Date of Patent: May 5, 2026

(54) RETRACTABLE STAIRS FOR A RECREATIONAL VEHICLE

(71) Applicant: Airxcel, Inc., Wichita, KS (US)

(72) Inventors: Michael John Longest, Dayton, TN (US); William Edward Mooneyham, Dayton, TN (US); Robert Neil Lankford, Graysville, TN (US); Michael James Shaver, Cleveland, TN (US); Stacey L. Smith, Dayton, TN (US); Norman Troy McGuffey, Cleveland, TN (US); Steven Andrew Reffner, Cleveland, TN (US); John Alan Eaton, Jr., Bristol, IN (US)

(73) Assignee: Airxcel, Inc., Wichita, KS (US)

( * ) Notice: Subject to any disclaimer, the term of this patent is extended or adjusted under 35 U.S.C. 154(b) by 268 days.

(21) Appl. No.: 18/630,490

(22) Filed: Apr. 9, 2024

(65) Prior Publication Data

US 2024/0336202 A1 Oct. 10, 2024

Related U.S. Application Data

(60) Provisional application No. 63/495,261, filed on Apr. 10, 2023.

(51) Int. Cl.
*B60R 3/02* (2006.01)
(52) U.S. Cl.
CPC ..................................... *B60R 3/02* (2013.01)
(58) Field of Classification Search
CPC ...................................................... B60R 3/02
See application file for complete search history.

(56) References Cited

U.S. PATENT DOCUMENTS

| | | | |
|---|---|---|---|
| 3,469,654 A | 9/1969 | Dohrman |
| 3,493,077 A | 2/1970 | Doten |
| 3,593,821 A | 7/1971 | Lister |

(Continued)

FOREIGN PATENT DOCUMENTS

DE 102008057537 A1 * 5/2010 ............... B60R 3/02

*Primary Examiner* — Alexander K Garlen
(74) *Attorney, Agent, or Firm* — Hovey Williams LLP

(57) ABSTRACT

Retractable stairs for mounting in an exterior doorway of a recreational vehicle are provided with a spaced apart stringers and a tread extending between the stringers. Spaced apart straps are connected to upper ends of the stringers and are pivotally mounted to a floor in an interior space of the recreational vehicle to allow movement of the stringers and the tread through the exterior doorway between a retracted position stowed within the recreational vehicle and a deployed position outside of the recreational vehicle. A threshold plate is positioned between the straps and is fixed against movement during the pivoting movement of the straps. Locking latches extend outwardly from the stringers and are positionable for engaging a jamb of the exterior doorway for releasably securing the stringers and the tread in the retracted position. Extensible support legs are mounted on the stringers and extendable downwardly below the stringers to engage a ground surface for supporting the retractable stairs. The extensible support legs are operable to extend downwardly in ratcheting increments of 0.5 inches or less by movement of a ratcheting latch.

20 Claims, 12 Drawing Sheets

(56) References Cited

U.S. PATENT DOCUMENTS

| | | | |
|---|---|---|---|
| 3,693,754 A | | 9/1972 | Butler |
| 4,264,084 A | | 4/1981 | Telles |
| 4,930,797 A | * | 6/1990 | Parrill ........................ B60R 3/02 |
| | | | 280/166 |
| 5,205,603 A | | 4/1993 | Burdette |
| 6,270,139 B1 | | 8/2001 | Simpson |
| 7,878,519 B2 | | 2/2011 | Hallmark |
| 8,251,178 B2 | | 8/2012 | Krobot |
| 9,010,473 B1 | | 4/2015 | Rasmussen |
| 9,308,869 B1 | | 4/2016 | Owens |
| 9,771,025 B1 | | 9/2017 | Nebel |
| 9,903,121 B2 | | 2/2018 | Tompkins |
| 10,266,121 B2 | | 4/2019 | Nebel |
| 10,518,706 B2 | | 12/2019 | Granzotto |
| 10,518,708 B1 | | 12/2019 | Honer |
| 10,519,671 B2 | | 12/2019 | Tompkins |
| 10,525,891 B1 | | 1/2020 | Honer |
| 10,604,056 B2 | | 3/2020 | Roth |
| 10,647,261 B1 | | 5/2020 | Honer |
| 10,662,654 B2 | | 5/2020 | Tompkins |
| 10,850,669 B2 | | 12/2020 | Honer |
| D921,927 S | | 6/2021 | Fuller |
| 11,437,850 B2 | | 9/2022 | Quigley |
| 11,739,534 B2 | | 8/2023 | Tompkins |
| 12,415,460 B2 | | 9/2025 | Fuller |
| 2005/0285365 A1 | | 12/2005 | Manser |
| 2014/0345974 A1 | | 11/2014 | Nebel |
| 2018/0009386 A1 | * | 1/2018 | Nebel ........................ B60R 3/02 |
| 2018/0148936 A1 | * | 5/2018 | Tompkins ................ B60R 3/02 |
| 2018/0305934 A1 | * | 10/2018 | Tompkins ................ B60R 3/02 |
| 2019/0256005 A1 | * | 8/2019 | Granzotto ................ B60P 3/34 |
| 2019/0351832 A1 | | 11/2019 | Fuller |
| 2020/0102788 A1 | * | 4/2020 | Byers ...................... E06C 7/505 |
| 2020/0284039 A1 | * | 9/2020 | Tompkins ................ B60R 3/02 |
| 2020/0284095 A1 | | 9/2020 | Fuller |
| 2021/0261061 A1 | * | 8/2021 | Fuller ...................... E06C 7/44 |
| 2022/0064958 A9 | * | 3/2022 | Tompkins ................ B60R 3/02 |

* cited by examiner

18

74

20

22

26

12

10

36

13

36

30

28

68

36

72

76

66

76

38

48

58

40

60

24

49

16

RETRACTABLE STAIRS FOR A RECREATIONAL VEHICLE

BACKGROUND

The present disclosure relates generally to retractable stairs and, more particularly, to retractable stairs for mounting in an exterior doorway of a recreational vehicle.

Retractable stairs are frequently installed in the exterior doorways of motor homes, travel trailers, caravans, folding camping trailers, truck campers, and other types of recreational vehicles to allow entry to and exiting from the recreational vehicle. The stairs may be moved through the exterior doorway to a stowed position within the recreational vehicle by lifting and pivoting the stairs about a pivot axis. The stairs may then be lowered through the exterior doorway to a deployed position by pivoting in an opposite direction about the pivot axis to place the stairs outside the recreational vehicle where they extend from the exterior doorway toward the ground surface. One example of this type of retractable stairs is shown in German published patent application 24 44 552. The stairs disclosed in that application are connected by a flat bar to a hinge that is mounted on the floor of the recreational vehicle behind the exterior doorway. The stairs can be folded about the hinge into the recreational vehicle during travel and then unfolded about the hinge for positioning outside of the recreational vehicle.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, the disclosure is directed to retractable stairs for mounting in an exterior doorway of a recreational vehicle, said retractable stairs comprising: first and second stringers positioned in spaced apart and parallel relationship and each having an upper end and a lower end; at least one tread extending between the first and second stringers; first and second straps positioned in spaced apart relationship and coupled with the upper ends of the first and second stringers and constructed for pivotally mounting to a floor in an interior space of the recreational vehicle to allow movement of the first and second stringers and the tread through the exterior doorway between a retracted position stowed within the recreational vehicle and a deployed position outside of the recreational vehicle; and a threshold plate positioned between the first and second straps and fixed against movement during pivoting movement of the first and second straps.

In another aspect, the disclosure is directed to retractable stairs for mounting in an exterior doorway of a recreational vehicle, said retractable stairs comprising: first and second stringers positioned in spaced apart and parallel relationship and each having an upper end and a lower end; at least one tread extending between the first and second stringers; first and second straps positioned in spaced apart relationship and coupled with the upper ends of the first and second stringers and constructed for pivotally mounting to a floor in an interior space of the recreational vehicle to allow movement of the first and second stringers and the tread through the exterior doorway between a retracted position stowed within the recreational vehicle and a deployed position outside of the recreational vehicle; a threshold plate positioned between the first and second straps and fixed against movement during pivoting movement of the first and second straps; a first locking latch carried by the first stringer and operable for releasably securing the first and second stringers and the tread in the retracted position; a first extensible support leg mounted on the first stringer and extendable downwardly below the lower end of the first stringer to engage a ground surface for supporting the retractable stairs; and a second extensible support leg mounted on the second stringer and extendable downwardly below the lower end of the second stringer to engage a ground surface for supporting the retractable stairs.

In a further aspect, the disclosure is directed to retractable stairs for mounting in an exterior doorway of a recreational vehicle, said retractable stairs comprising: first and second stringers positioned in spaced apart and parallel relationship and each having an upper end and a lower end; at least one tread extending between the first and second stringers; first and second straps positioned in spaced apart relationship and coupled with the upper ends of the first and second stringers and constructed for pivotally mounting to a floor in an interior space of the recreational vehicle to allow movement of the first and second stringers and the tread through the exterior doorway between a retracted position stowed within the recreational vehicle and a deployed position outside of the recreational vehicle; a threshold plate positioned between the first and second straps and fixed against movement during pivoting movement of the first and second straps; a riser extending between the first and second stringers and extending upwardly from a back of the tread; a first locking latch carried by the first stringer and operable for releasably securing the first and second stringers and the tread in the retracted position; a second locking latch carried by the second stringer and operable for releasably securing the first and second stringers and the tread in the retracted position, wherein the first locking latch extends outwardly from the first stringer and the second locking latch extends outwardly from the second stringer and are positionable for engaging a jamb of the exterior doorway for the releasably securing of the first and second stringers and the tread in the retracted position, wherein the first locking latch and the second locking latch are outwardly adjustable for engaging jambs of exterior doorways of different sizes; a first extensible support leg mounted on the first stringer and extendable downwardly below the lower end of the first stringer to engage a ground surface for supporting the retractable stairs; and a second extensible support leg mounted on the second stringer and extendable downwardly below the lower end of the second stringer to engage a ground surface for supporting the retractable stairs, wherein the extensible support legs are operable to extend downwardly in ratcheting increments of 0.5 inches or less by movement of a ratcheting latch.

BRIEF DESCRIPTION OF THE DRAWINGS

The present technology is described in detail below with reference to the attached drawing figures, in which like numerals represent the same components, and wherein.

DETAILED DESCRIPTION

Figure 1:
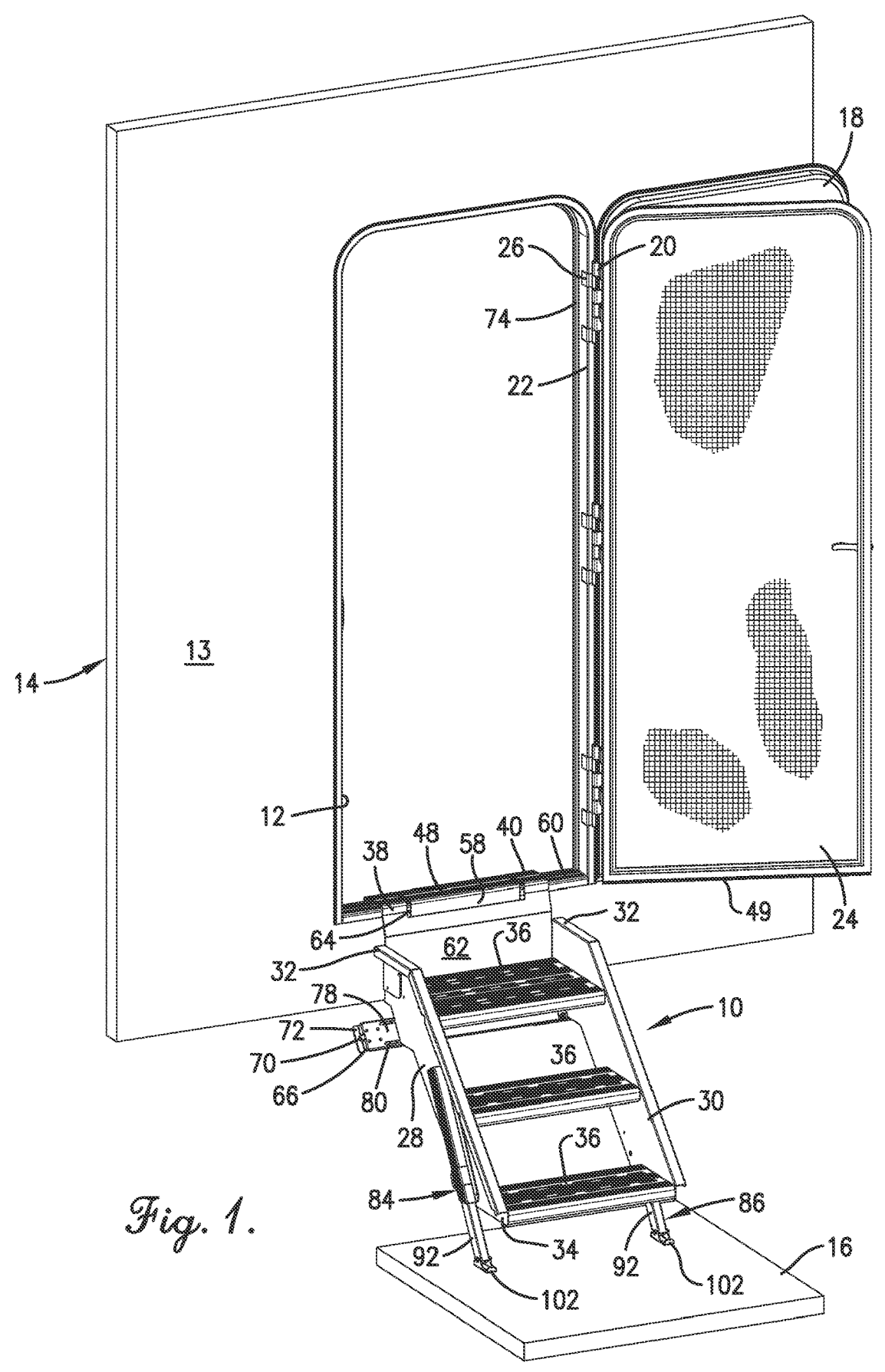
FIG. 1 is a front perspective view of an embodiment of retractable stairs shown in a deployed position outside of a recreational vehicle to allow entry to and exiting from the recreational vehicle.
Figure 2:
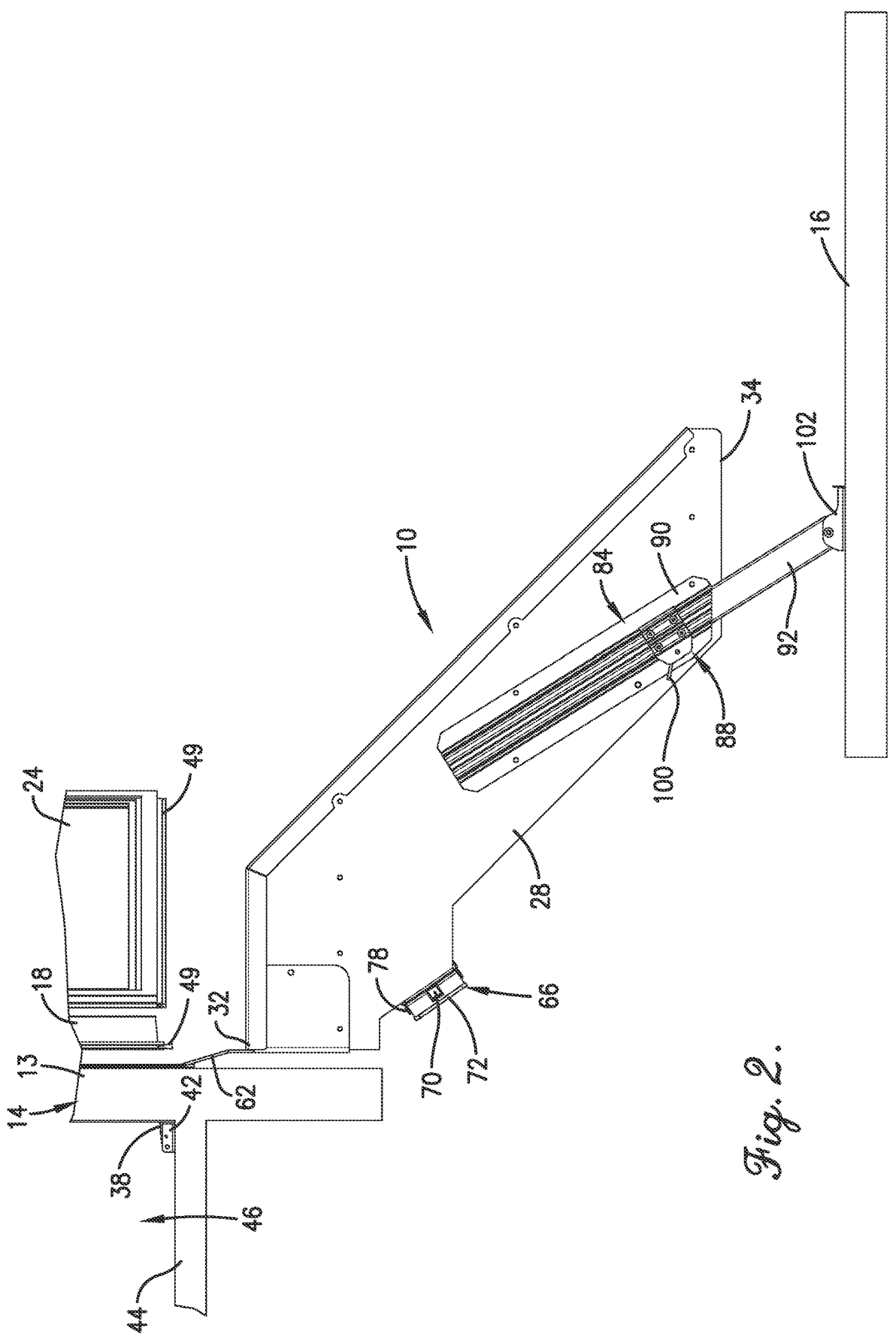
FIG. 2 is a side elevation view of the retractable stairs in the deployed position.
Figure 3:
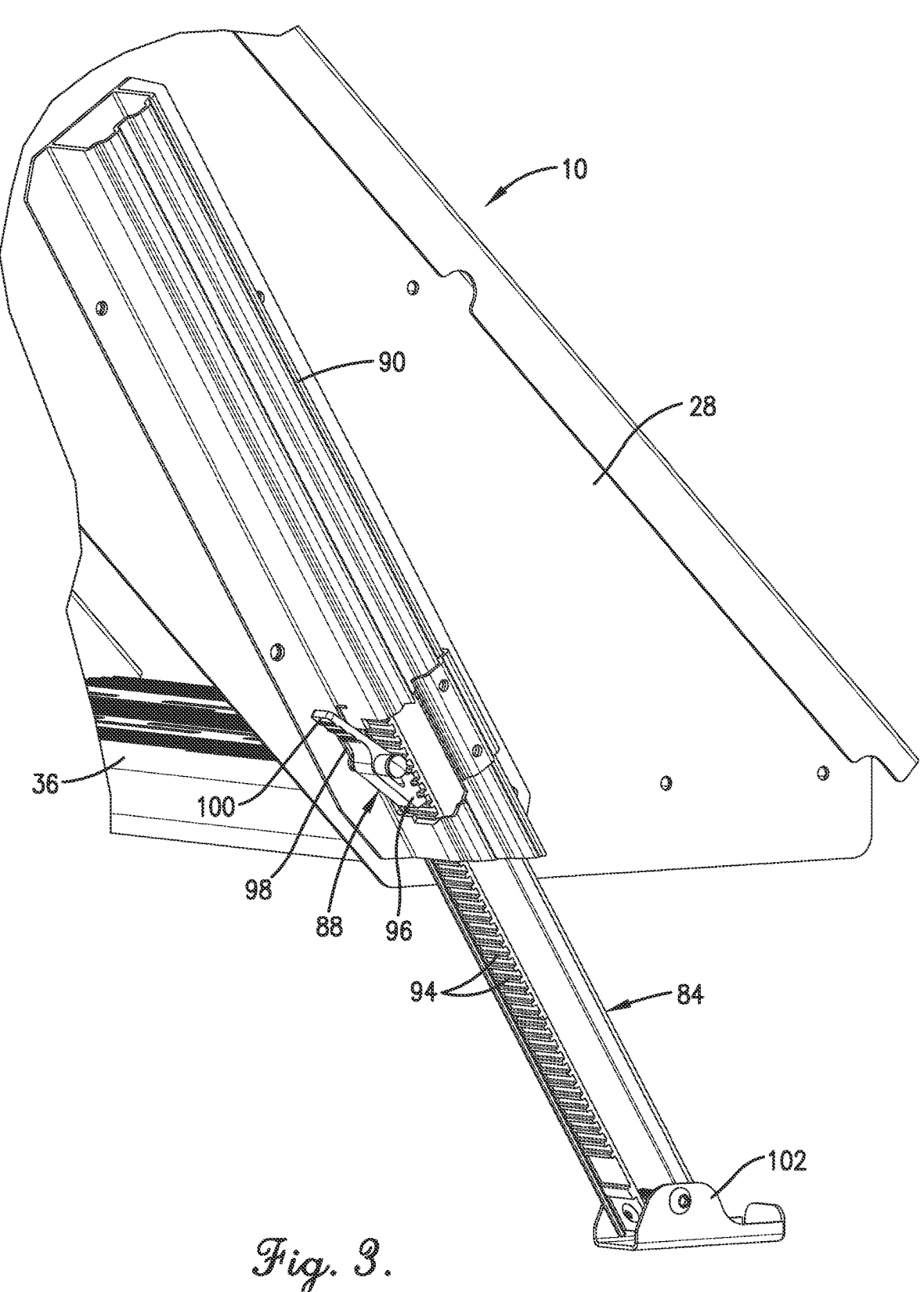
FIG. 3 is a fragmentary rear perspective view of the retractable stairs and showing a support leg that extends to a ground surface from a stringer of the retractable stairs.

Turning now to the drawings in greater detail and initially to FIGS. 1-3, retractable stairs designated generally by the numeral 10 are shown installed in a deployed position extending from an exterior doorway 12 in an exterior wall 13 of a recreational vehicle 14 toward a ground surface 16 to allow entry to and exiting from the recreational vehicle 14. The exterior doorway 12 includes an exterior door 18 mounted by hinges 20 to a door jamb 22. A screen door 24 may also be mounted by hinges 26 to the door jamb 22. Both the exterior door 18 and the screen door 24 may be opened and closed while the retractable stairs 10 are in the deployed position and while the retractable stairs 10 in the retracted stowed position described below.

The retractable stairs 10 comprise first and second stringers 28 and 30 that are positioned in spaced apart and parallel relationship to each other, with each having an upper end 32 and a lower end 34. At least one tread 36 extends between and is mounted to and supported by the first and second stringers 28 and 30. In the illustrated embodiment, three of the treads 36 are used and may be spaced apart so that there is an equal rise between them. In other embodiments, one, two, or four or more treads 36 may be used.

Figure 4:
FIG. 4 is a front perspective view similar to that shown in FIG. 1 but showing the retractable stairs in a partially retracted position.
Figure 5:
FIG. 5 is a front perspective view similar to the views shown in FIGS. 1 and 4 but showing the retractable stairs in a fully retracted position stowed within the recreational vehicle.
Figure 6:
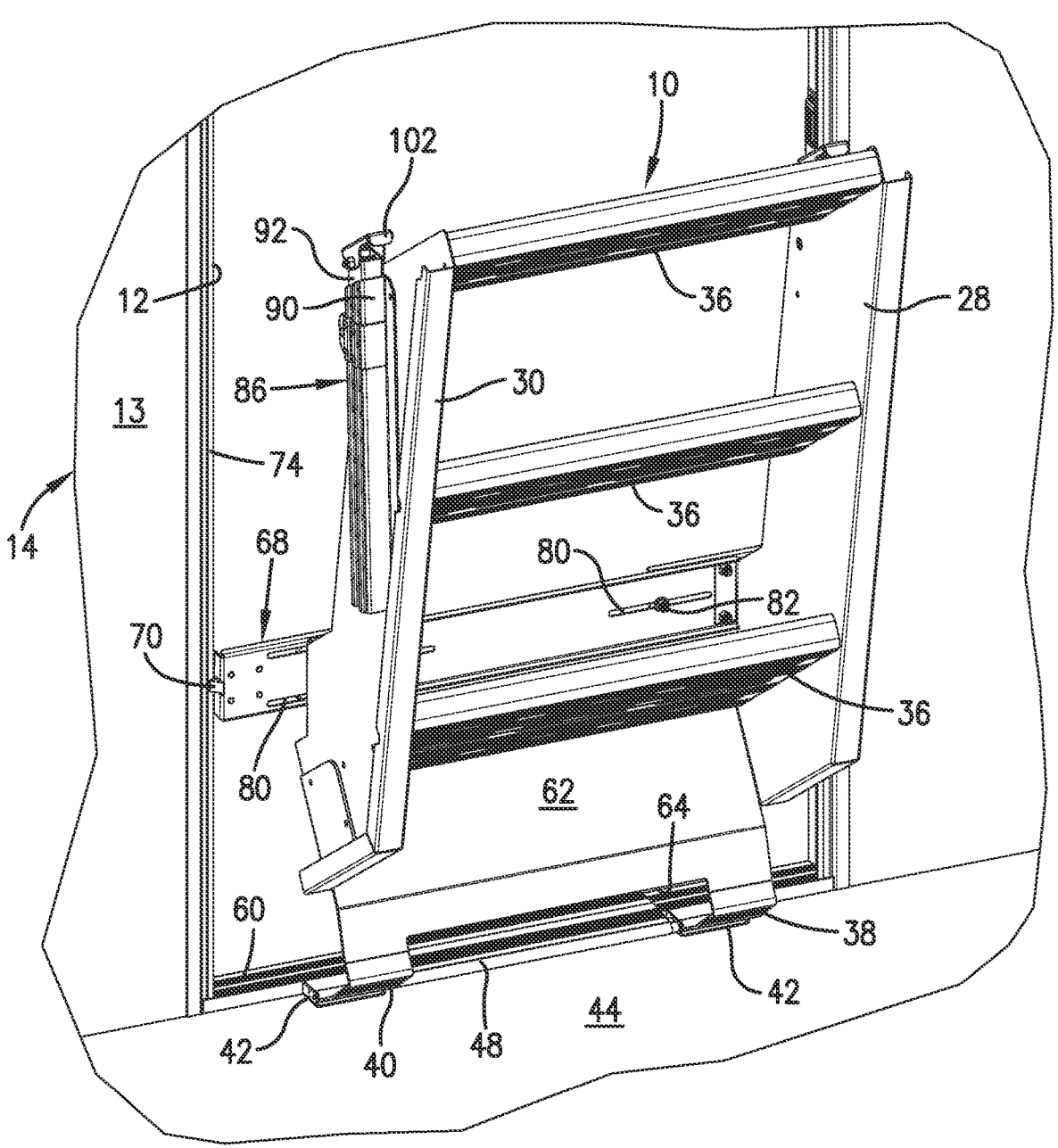
FIG. 6 is a rear perspective view of the retractable stairs shown in the fully retracted position stowed within the recreational vehicle.
Figure 9:
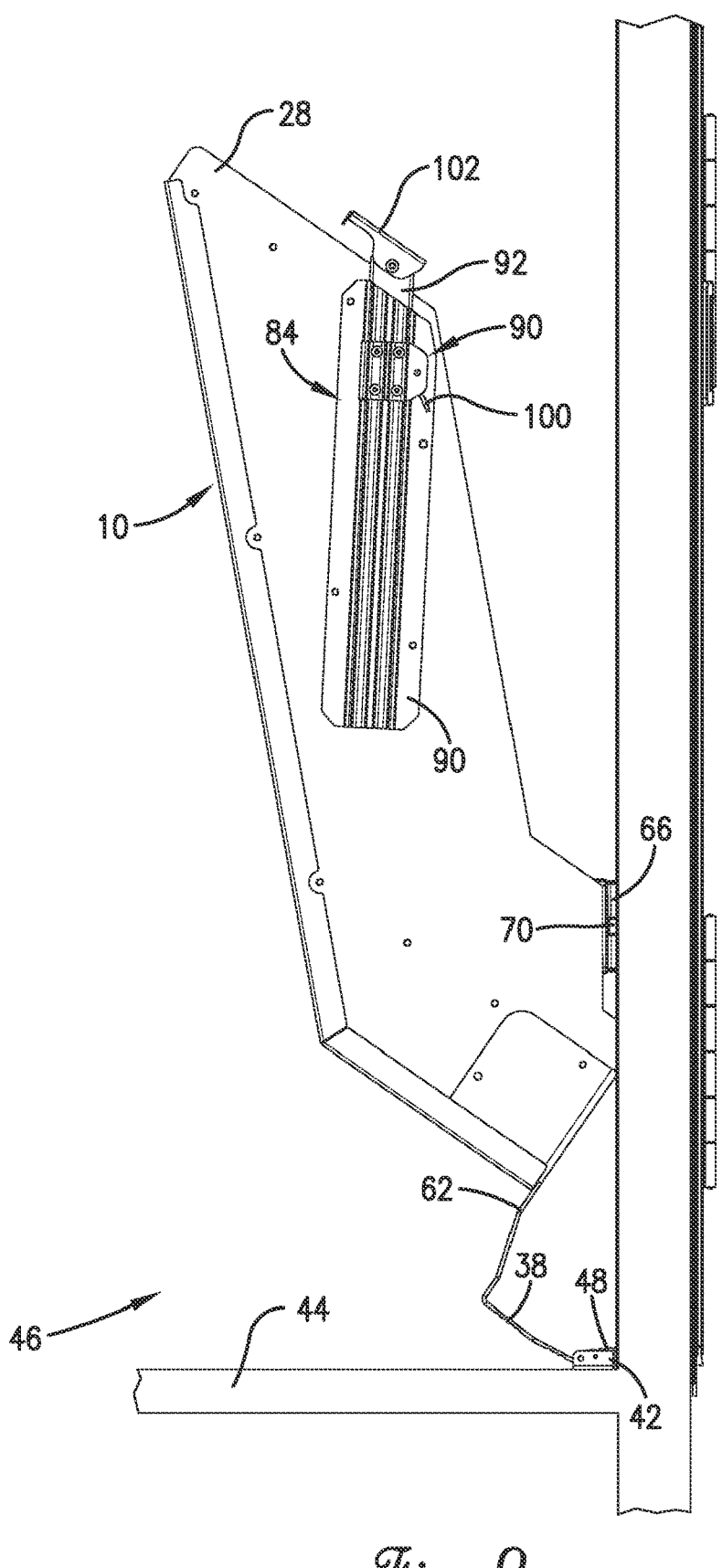
FIG. 9 is a side elevation view of the retractable stairs shown in the fully retracted position stowed within the recreational vehicle.

The retractable stairs 10 include first and second straps 38 and 40 that are positioned in spaced apart relationship from each other and are coupled at one end with the upper ends 32 of the first and second stringers 28 and 30. The first and second straps 38 and 40 are pivotally coupled at their other ends with brackets 42 that are mounted to a floor 44 in an interior space 46 of the recreational vehicle 14. The pivoting movement of the first and second straps 38 and 40 allows corresponding movement of the first and second stringers 28 and 30 and the tread(s) 36 between the deployed position shown in FIGS. 1-3 and a retracted position in which the first and second stringers 28 and 30 and the tread(s) 36 have been lifted and pivoted through the exterior doorway 12 for storage within the recreational vehicle 14 as shown in FIGS. 5, 6 and 9. An intermediate position of the retractable stairs 10 as they are moved between the deployed and retracted positions is shown in FIG. 4.

When the retractable stairs 10 are in the deployed position extending from the exterior doorway 12 toward the ground surface 16, a portion of the first and second straps 38 and 40 may form part of the threshold underlying the exterior door 18 and the screen door 24 if present. A threshold plate 48 is positioned between the first and second straps 38 and 40 to form an additional and coplanar part of the threshold together with the first and second straps 38 and 40 underlying the exterior door 18 and the screen door 24. The threshold plate 48 may be fixed against movement as the first and second straps 38 and 40 are pivoted to deploy and retract the retractable stairs 10. A brush-like or other type of seal 49 may be attached to the bottom of the screen door 24 and/or the exterior door 18 to impede entry of debris into the interior space 46 of the reactional vehicle 14.

Figure 10:
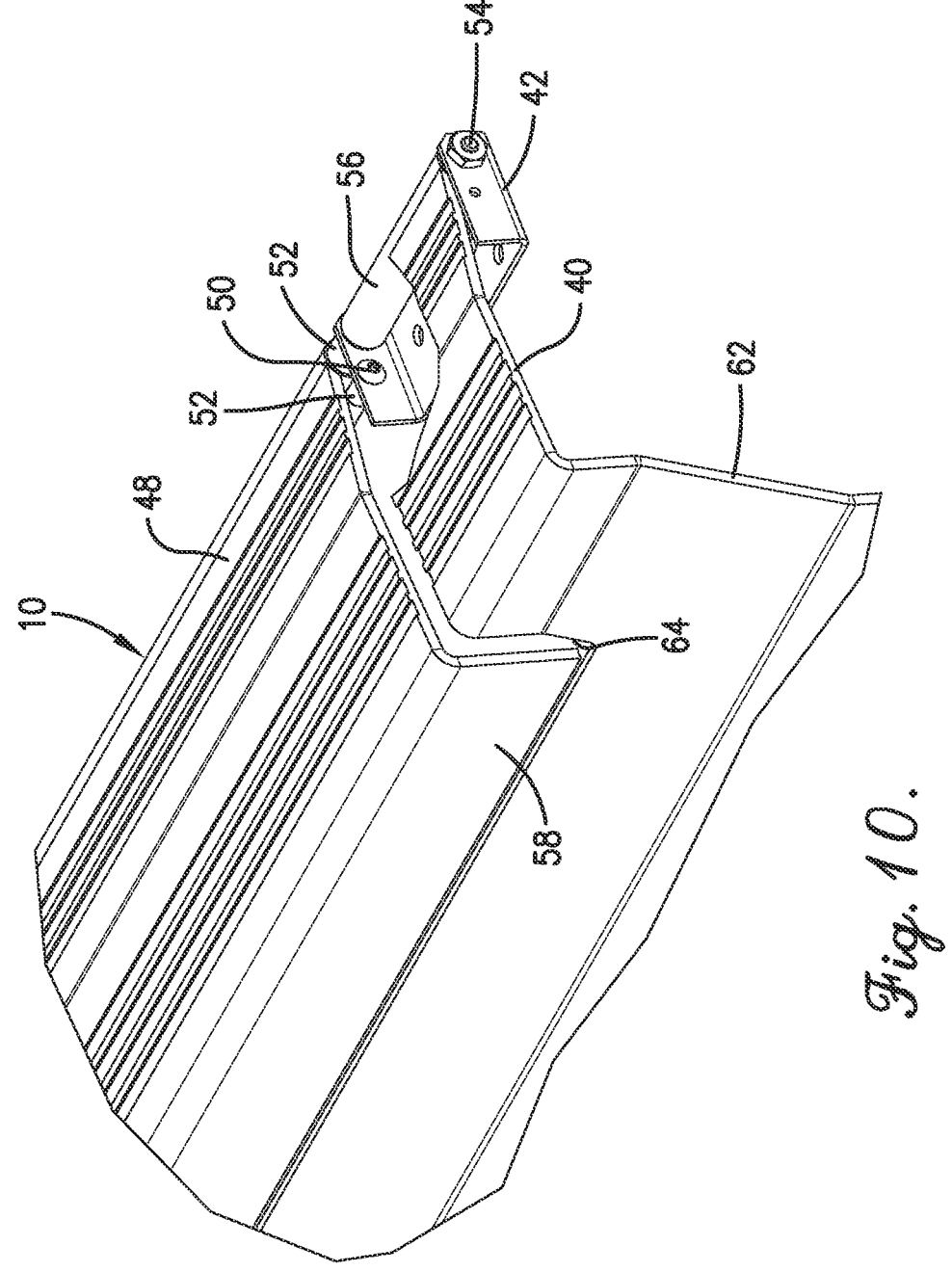
FIG. 10 is a fragmentary front perspective view of a threshold of the retractable stairs when in the deployed position.
Figure 11:
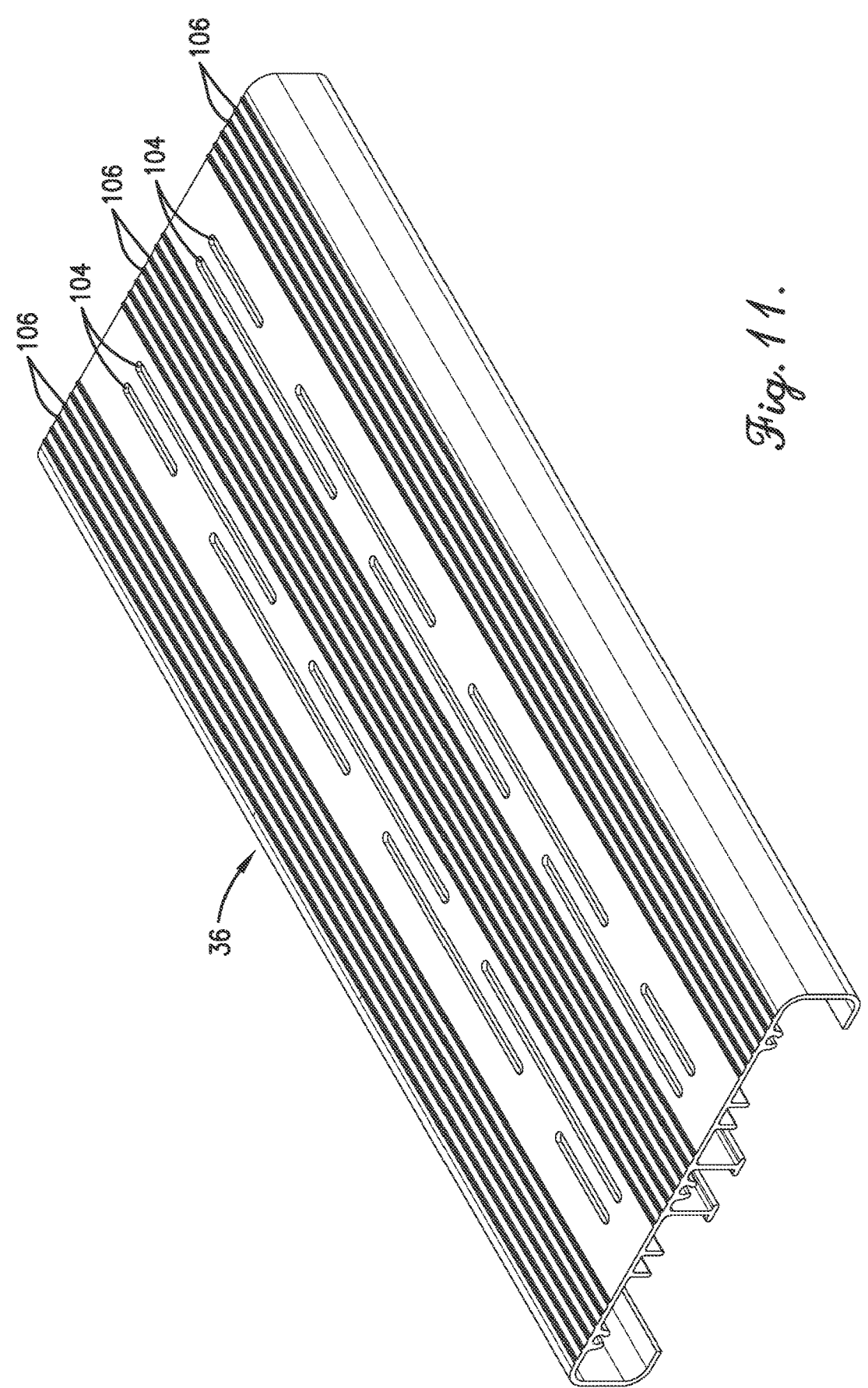
FIG. 11 is a top perspective view of a tread of the retractable stairs.
Figure 12:
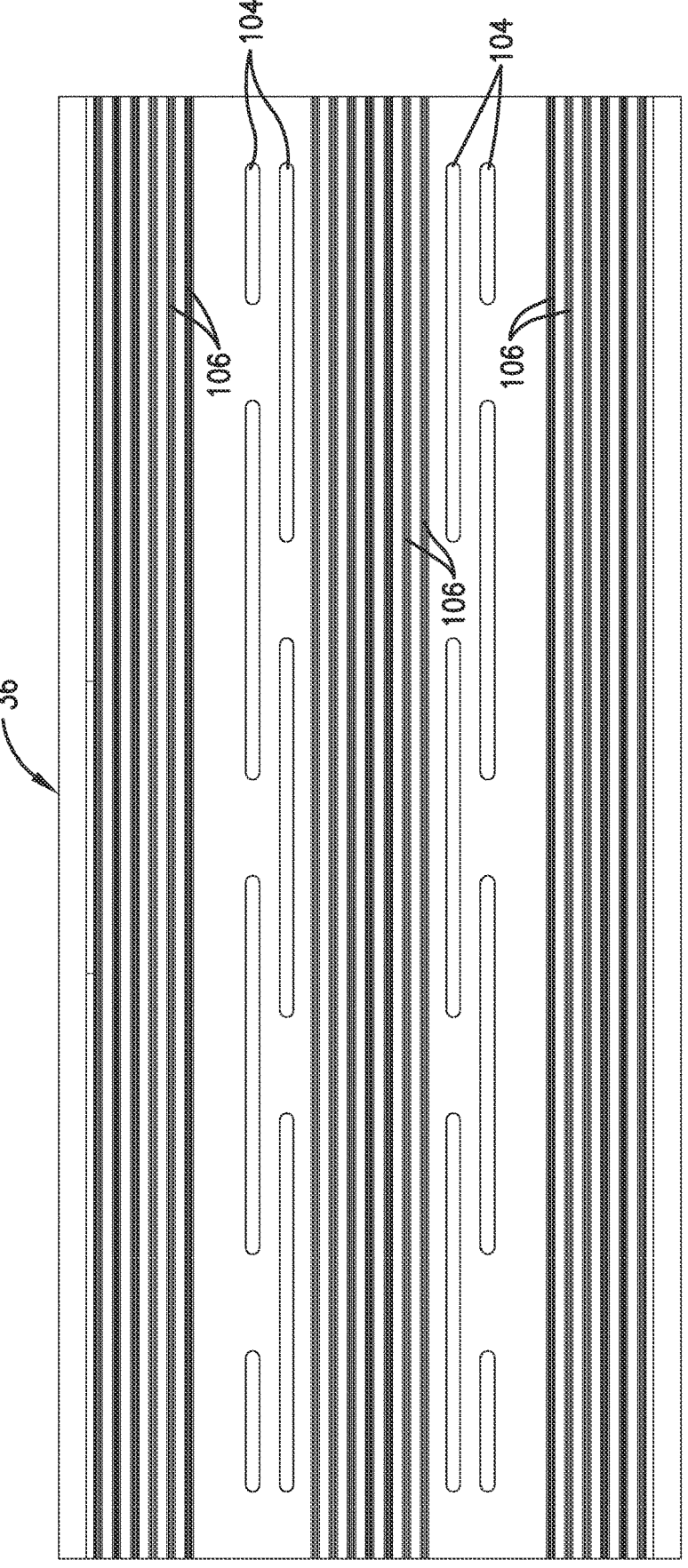
FIG. 12 is a top plan view of the tread.
Figures 13, 14:
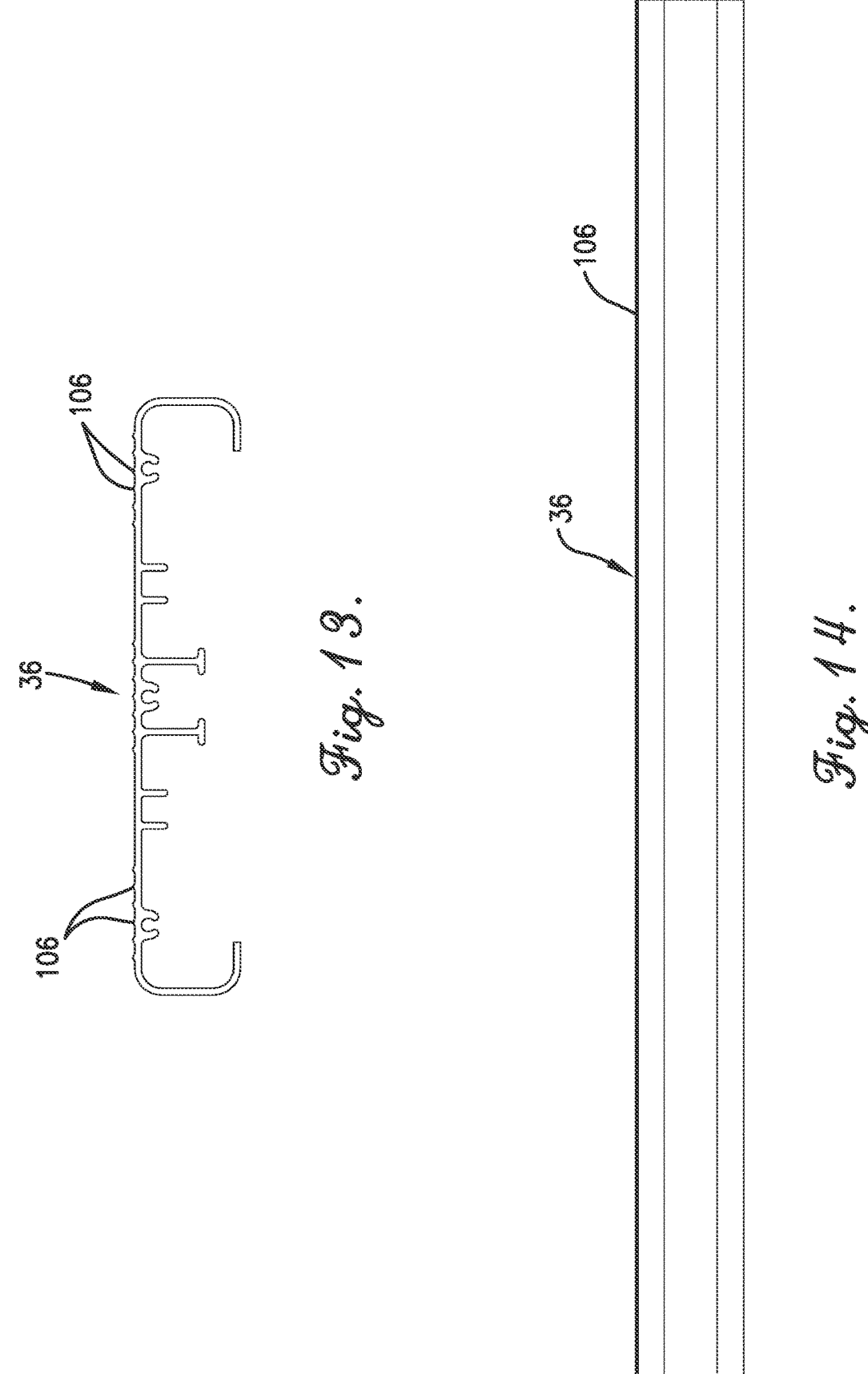
FIG. 13 is a side elevation view of the tread.
FIG. 14 is a front elevation view of the tread.

As best shown in FIG. 10, the threshold plate 48 may be secured to one or both of the brackets 42 that are mounted to the floor 44 in the recreational vehicle 14. In one embodiment as shown in FIG. 10, the threshold plate 48 may be releasably secured to at least one of the brackets 42 by a screw or other fastener 50 that extends through a sidewall of the bracket 42 and is tightened within a boss 52 fixed at an end portion of the threshold plate 48. The threshold plate 48 may also be secured to a pin 54 (FIG. 10) that extends through the sidewalls of each bracket 42 and is received within another boss 52 fixed at each end portion of the threshold plate 48. The pin 54 may also serve as the pivot axis of the first and second straps 38 and 40 by extending through a barrel 56 formed or attached at the corresponding end of each of the first and second straps 38 and 40.

As can be seen in FIGS. 1, 5, 6 and 9, the threshold plate 48 may have an inverted generally "L" shaped cross-sectional profile with a downwardly extending outer flange 58 that extends below a door sill 60. A riser 62 that may be formed as part of, or connected to, the first and second straps 38 extends between and is connected to the first and second stringers 38 and 40 and extends upwardly from the uppermost tread 36. The riser 62 may include a cutout portion 64 that receives the downwardly extending outer flange 58 of the threshold plate 48 when the retractable stairs 10 are in the deployed position.

The retractable stairs 10 may also include a first locking latch 66 that is carried by the first stringer 28 and is operable for releasably securing the first and second stringers 38 and 40 and the tread(s) 36 in the retracted position within the recreational vehicle 14, such as during travel of the recreational vehicle 14. A second locking latch 68 may be carried by the second stringer 30 and is also operable for releasably securing the first and second stringers 38 and 40 and the tread(s) 36 in the retracted position within the recreational vehicle 14. In one embodiment, the first and second locking latches 66 and 68 are mounted to an underside of, and extend outwardly from, the first and second stringers 38 and 40, respectively. The first and second locking latches 66 and 68 may releasably engage the door jamb 22 to secure the retractable stairs 10 in the retracted stowed position and then allow the retractable stairs 10 to be moved to the deployed position.

Figures 7, 8:
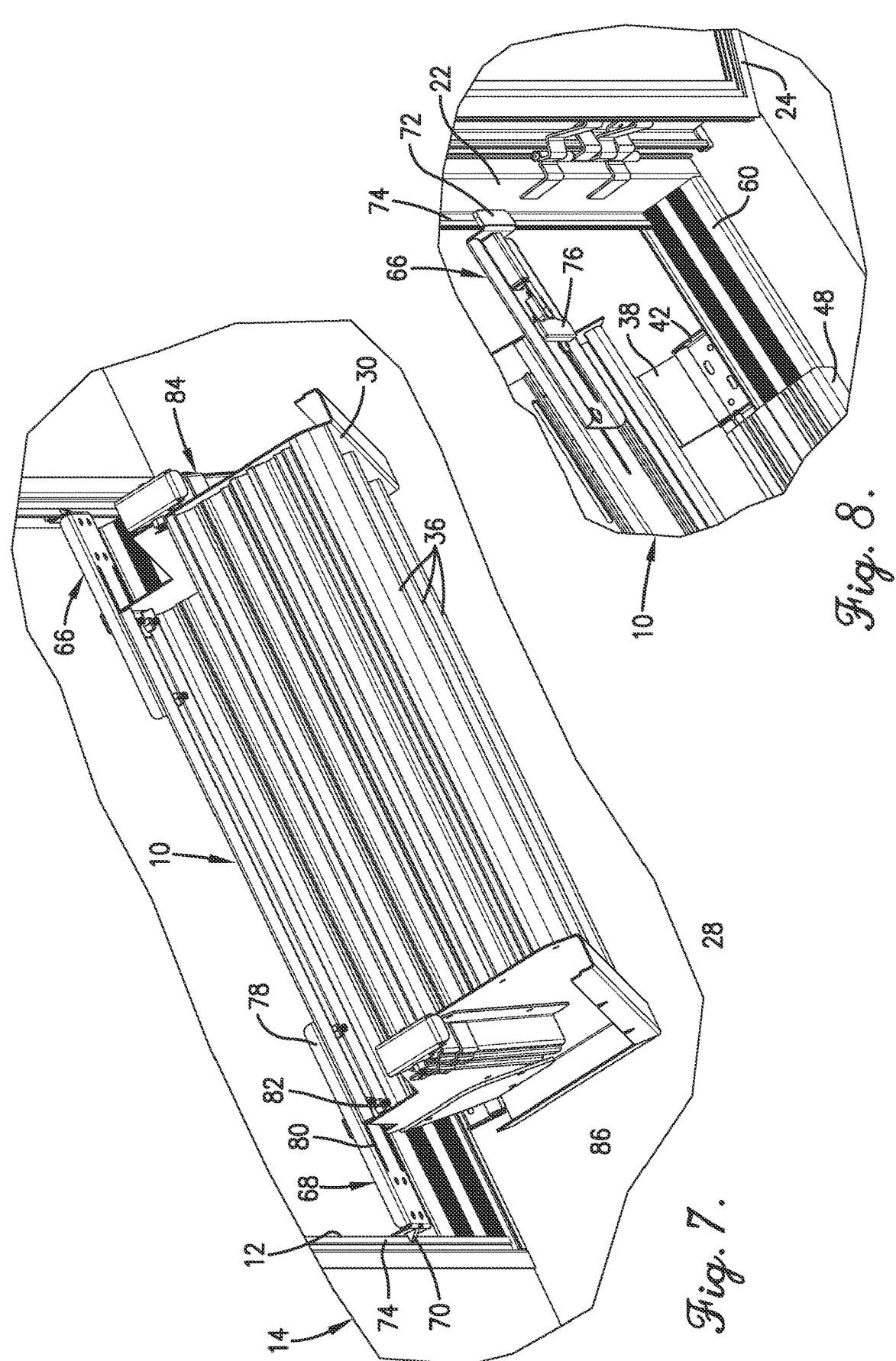
FIG. 7 is a top rear perspective view of the retractable stairs shown in the fully retracted position stowed within the recreational vehicle.
FIG. 8 is a fragmentary top front perspective view of the retractable stairs shown in the fully retracted position stowed within the recreational vehicle.

In the illustrated embodiment as best shown in FIGS. 7 and 8, the first and second locking latches 66 and 68 may each include a spring-loaded latch 70 and a stop flange 72 that is spaced a preselected distance from the latch 70. The latch 70 is constructed with a sloping side that allows the latch 70 to be depressed when it is brought into engagement with a door stop 74 or other structure carried by the door jamb 22. When the retractable stairs 10 are fully retracted, the stop flange 72 engages against an outer side of the door stop 74 and the latch 70 extends under spring pressure to engage against an inner side of the door stop 74. The door stop 74 is thus captured by first and second locking latches 66 and 68 to prevent further pivoting movement of the retractable steps 10 either inwardly or outwardly. The retractable steps 10 may be pivoted from the retracted stowed position to the deployed position by a person retracting each latch 70 using a slide handle 76 (FIG. 8).

The first and second locking latches 66 and 68 include mounting brackets 78 that are constructed for allowing be outwardly and inwardly adjustment of the first and second locking latches 66 and 68 to accommodate exterior doorways 12 of different sizes. In the embodiment best shown in FIGS. 7 and 8, the mounting brackets 78 may include elongated slots 80 through which bolts or other fasteners 82 extend and are secured to the first and second stringers 28 and 30. The fasteners 82 may be loosened to allow movement along the slots 80 and then retightened once the desired positioning is obtained.

Turning more specifically to FIGS. 2 and 3, the retractable stairs 10 may include a first extensible support leg 84 that is mounted on the first stringer 28 and is extendable downwardly below the lower end 34 of the first stringer 28 to engage the ground surface 16 and provide support for the retractable stairs 10. A second extensible support leg 86 may be mounted on the second stringer 30 and is extendable downwardly below the lower end 34 of the second stringer 30 to also engage the ground surface 16 and provide additional support for the retractable stairs 10. The first and second support legs 84 and 86 may be mounted on the outer sides of the first and second stringers 28 and 30 and positioned so that they extend at a non-parallel angle to the longitudinal length of the first and second stringers 28 and 30. This allows the engagement of the first and second support legs 84 and 86 on the ground surface to be located below the lowermost tread 36 rather than extending outwardly beyond the tread 36.

Each of the first and second support legs 84 and 86 are operable so that they may extend downwardly in ratcheting increments of about 0.5 inches or less by movement of a ratcheting latch 88 that may be operated by a person's hand or foot. In the embodiment illustrated in FIGS. 2 and 3, each first and second support leg 84 and includes a fixed bracket 90 on which the ratcheting latch 88 is mounted and within which an extendable leg portion 92 is received. The leg portion 92 includes a linear track of teeth 94 facing the ratcheting latch 88. The ratcheting latch 88 may include a triple pawl 96 that is able to capture two of the teeth 94 at a time by extending into the spacing between adjacent ones of the teeth 94. The spacing between adjacent teeth 94 is selected to allow the desired extension increments, which may be less about 0.5 inches as noted above, or less than about 0.25 inches.

The ratcheting latch 88 includes a biasing spring 98 that exerts a force resisting removal of the pawl 94 from its position capturing the individual one of the teeth 94. The ratcheting latch 88 includes a thumb lever 100 that allows a person to counteract the spring biasing force and release the ratcheting latch 88 from engagement with the track of teeth 94 in order to extend or retract the leg portion 92 within the fixed bracket 90. A foot 102 may be pivotally mounted on a lower end of the leg portion 92 to accommodate a sloping ground surface 16 and to provide a larger support footprint.

Turning now to FIGS. 11-14, one or more of the treads 36 may have elongated drainage slots 104 and elongated raised traction ribs 106 positioned so that they extend in a direction between the first and second stringers 28 and 30. In one embodiment, parallel rows of the drainage slots 104 may be provided and drainage slots 104 in adjacent rows may be staggered from each other. Similarly, parallel rows of the raised traction ribs 106 may be provided. In one example, sets of the parallel rows of drainage slots 104 are positioned between sets of the parallel rows of raised traction ribs 106. One set of parallel rows of the raised traction ribs 106 may be positioned at a front portion of the tread 36 and one set of parallel rows of the raised traction ribs 106 may be positioned at an intermediate location towards a back portion of the tread 36. In a particular embodiment, sets of parallel rows of the raised traction ribs 106 are placed at the front portion, back portion, and an intermediate portion of the tread 36.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

In the specification and claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claim, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Range limitations may be combined and/or interchanged. Such ranges are identified and include all the sub-ranges contained therein unless context or language indicates otherwise.

As used herein, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

The terms "coupled," "fixed," "attached to," and the like refer to both direct coupling, fixing, or attaching, as well as indirect coupling, fixing, or attaching through one or more intermediate components or features, unless otherwise specified herein.

Although the present application sets forth a detailed description of embodiments of the retractable stairs 10, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

What is claim is:

1. Retractable stairs for mounting in an exterior doorway of a recreational vehicle, said retractable stairs comprising:
   first and second stringers positioned in spaced apart and parallel relationship and each having an upper end and a lower end;
   at least one tread extending between the first and second stringers;
   first and second straps positioned in spaced apart relationship and coupled with the upper ends of the first and second stringers and constructed for pivotally mounting to a floor in an interior space of the recreational vehicle to allow movement of the first and second stringers and the tread through the exterior doorway between a retracted position stowed within the recreational vehicle and a deployed position outside of the recreational vehicle; and
   a threshold plate positioned between the first and second straps and fixed against movement during pivoting movement of the first and second straps, the threshold plate coplanar with the first and second straps in the deployed position.

2. The retractable stairs of claim 1, including a riser extending between the first and second stringers and extending upwardly from a back of the tread.

3. The retractable stairs of claim 1, including a first locking latch carried by the first stringer and operable for releasably securing the first and second stringers and the tread in the retracted position.

4. The retractable stairs of claim 3, including a second locking latch carried by the second stringer and operable for releasably securing the first and second stringers and the tread in the retracted position.

5. The retractable stairs of claim 4, wherein the first locking latch extends outwardly from the first stringer and the second locking latch extends outwardly from the second stringer and are positionable for engaging a jamb of the exterior doorway for the releasably securing of the first and second stringers and the tread in the retracted position.

6. The retractable stairs of claim 5, wherein the first locking latch and the second locking latch are outwardly adjustable for engaging jambs of exterior doorways of different sizes.

7. The retractable stairs of claim 1, including an extensible support leg mounted on the first stringer and extendable downwardly below the lower end of the first stringer to engage a ground surface for supporting the retractable stairs.

8. The retractable stairs of claim 7, including another extensible support leg mounted on the second stringer and extendable downwardly below the lower end of the second stringer to engage a ground surface for supporting the retractable stairs.

9. The retractable stairs of claim 8, wherein the extensible support legs are operable to extend downwardly in ratcheting increments of 0.5 inches or less by movement of a ratcheting latch.

10. The retractable stairs of claim 9, wherein the extensible support legs are operable to retract by the movement of the ratcheting latch.

11. The retractable stairs of claim 1, comprising two, three or four of the treads.

12. Retractable stairs for mounting in an exterior doorway of a recreational vehicle, said retractable stairs comprising:
   first and second stringers positioned in spaced apart and parallel relationship and each having an upper end and a lower end;
   at least one tread extending between the first and second stringers;
   first and second straps positioned in spaced apart relationship and coupled with the upper ends of the first and second stringers and constructed for pivotally mounting to a floor in an interior space of the recreational vehicle to allow movement of the first and second stringers and the tread through the exterior doorway between a retracted position stowed within the recreational vehicle and a deployed position outside of the recreational vehicle;
   a threshold plate positioned between the first and second straps and fixed against movement during pivoting movement of the first and second straps, the threshold plate coplanar with the first and second straps in the deployed position;

a first locking latch carried by the first stringer and operable for releasably securing the first and second stringers and the tread in the retracted position;

a first extensible support leg mounted on the first stringer and extendable downwardly below the lower end of the first stringer to engage a ground surface for supporting the retractable stairs; and a second extensible support leg mounted on the second stringer and extendable downwardly below the lower end of the second stringer to engage a ground surface for supporting the retractable stairs.

13. The retractable stairs of claim 12, wherein the extensible support legs are operable to extend downwardly in ratcheting increments of 0.5 inches or less by movement of a ratcheting latch.

14. The retractable stairs of claim 12, including a second locking latch carried by the second stringer and operable for releasably securing the first and second stringers and the tread in the retracted position.

15. The retractable stairs of claim 14, wherein the first locking latch extends outwardly from the first stringer and the second locking latch extends outwardly from the second stringer and are positionable for engaging a jamb of the exterior doorway for the releasably securing of the first and second stringers and the tread in the retracted position.

16. The retractable stairs of claim 15, wherein the first locking latch and the second locking latch are outwardly adjustable for engaging jambs of exterior doorways of different sizes.

17. The retractable stairs of claim 12, wherein the extensible support legs are operable to retract by the movement of the ratcheting latch.

18. The retractable stairs of claim 17, including a riser extending between the first and second stringers and extending upwardly from a back of the tread.

19. Retractable stairs for mounting in an exterior doorway of a recreational vehicle, said retractable stairs comprising:

first and second stringers positioned in spaced apart and parallel relationship and each having an upper end and a lower end;

at least one tread extending between the first and second stringers;

first and second straps positioned in spaced apart relationship and coupled with the upper ends of the first and second stringers and constructed for pivotally mounting to a floor in an interior space of the recreational vehicle to allow movement of the first and second stringers and the tread through the exterior doorway between a retracted position stowed within the recreational vehicle and a deployed position outside of the recreational vehicle;

a threshold plate positioned between the first and second straps and fixed against movement during pivoting movement of the first and second straps;

a riser extending between the first and second stringers and extending upwardly from a back of the tread;

a first locking latch carried by the first stringer and operable for releasably securing the first and second stringers and the tread in the retracted position;

a second locking latch carried by the second stringer and operable for releasably securing the first and second stringers and the tread in the retracted position, wherein the first locking latch extends outwardly from the first stringer and the second locking latch extends outwardly from the second stringer and are positionable for engaging a jamb of the exterior doorway for the releasably securing of the first and second stringers and the tread in the retracted position, wherein the first locking latch and the second locking latch are outwardly adjustable for engaging jambs of exterior doorways of different sizes;

a first extensible support leg mounted on the first stringer and extendable downwardly below the lower end of the first stringer to engage a ground surface for supporting the retractable stairs; and a second extensible support leg mounted on the second stringer and extendable downwardly below the lower end of the second stringer to engage a ground surface for supporting the retractable stairs, wherein the extensible support legs are operable to extend downwardly in ratcheting increments of 0.5 inches or less by movement of a ratcheting latch.

20. The retractable stairs of claim 19, wherein the at least one tread includes elongated drainage slots and raised traction ribs.

\* \* \* \* \*